Oct. 29, 1929.   B. B. McCOLLUM   1,733,507
DENTAL ARTICULATOR
Filed May 25, 1927   5 Sheets-Sheet 5

INVENTOR.
Beverly B. McCollum,
BY Arthur P. Knight and
Alfred W. Knight
ATTORNEYS Patented Oct. 29, 1929

1,733,507

UNITED STATES PATENT OFFICE

BEVERLY B. McCOLLUM, OF LOS ANGELES, CALIFORNIA

DENTAL ARTICULATOR

Application filed May 25, 1927. Serial No. 194,091.

This invention relates to an apparatus known as an articulator, for use by dentists for the purpose of mounting models of the teeth of a patient and imitating the movement of the jaws of such patient so as to facilitate the production of artificial tooth restorations, the cusps and ridges of which will coordinate with jaw movements.

An important object of the invention is to provide for more accurate and varied adjustment of the articulator, so as to enable the movements of the jaws of any particular patient to be reproduced with the utmost accuracy.

A further object of the invention is to provide for noting and recording all adjustments to which the articulator is set so that the same may easily be duplicated at any time.

Additional objects of the invention are to provide removable model frames and also means whereby the models may be readily removed from the frames and reinserted therein in the same relative positions; to provide for varying the length of the condyle axis rod to fit the distance between the caliper pins on the face bow with which the position of the condyles with respect to the jaws is determined, instead of having to move such calipers inwardly to meet the ends of the axis rod; to provide means for accurately locating the models in the articulator so that the horizontal plane of the articulator corresponds to the condyle orbital plane of the patient; to provide improved means for defining the condyle paths and for adjustment thereof; to provide means defining a curved condyle path as distinguished from a straight path; and to provide improved means for mounting and adjusting the incisal guide wings.

A further object of the invention is to provide an advantageous type of supporting stand for holding the articulator in inverted position.

The accompanying drawings illustrate the articulator of my invention and referring thereto.

The articulator shown in the drawings comprises a relatively fixed supporting structure or lower arm including a T-shaped supporting base 1 having two legs 2 at its rear corners, the third supporting leg being formed by the clamping nut for the supporting bracket of the incisal guide plates as hereinafter described. A raised supporting platform 3 is mounted by means of posts 4 and 4' on base 1 and extends entirely across the rear portion of the apparatus. Said platform is provided with flat horizontal track portions 7 adjacent its ends and is preferably bowed or arched upwardly at its middle portion as shown at 5 so as to permit unobstructed view of the models in the articulator from the rear. A center indicating screw 6 may be mounted in said upwardly bowed portion of said platform.

Each of the flat track portions 7 is provided with a guiding groove 8, and a supporting block 9 is slidably mounted on each of said track portions, said blocks 9 being provided with downwardly projecting lugs 10 engaging in the grooves 8 so as to guide said blocks along the track portions 7 and prevent the same from turning. Each block 9 is provided with a mark 11 cooperating with calibrations 19 on the rear face of platform 3 to indicate the lateral position of the condyle heads.

A condyle head ring 12 is mounted on each of the supporting blocks 9 in such manner as to permit rotation thereof about a vertical axis for varying the horizontal angle of the condyle path. For this purpose each of the rings 12 may be provided with a downwardly projecting pin 13 passing through an opening 14 in the block 9 and being threaded at its lower end to receive clamping nut 16 for holding the same in any position to which it may be turned. Loosening of clamping nut 16 not only permits the entire condyle head to be rotated upon the block 9, but also permits such block to slide horizontally in groove 8. The base 25 of each condyle head ring 12 may be provided with calibrations 26 on its rear face, cooperating with the mark 11 on the corresponding block 9, for indicating the horizontal angle of the condyle path. In order to hold the parts against accidental displacement, even when nut 16 is loosened, I prefer to provide a friction washer 17 between said nut and track 7, and a spring 18 between said nut and said washer and exerting sufficient pressure against the washer to hold the parts in position by friction against displacement by jarring of the articulator, while permitting manual adjustment thereof.

For the purpose of effecting sliding movement of blocks 9 so as to adjust the distance between the condyle heads, an adjusting screw 20 may be threaded in each of said blocks, said adjusting screw being provided with a knurled knob 21 at its outer end and resting in a notch 22 in an upturned flange 23 at the corresponding end of platform 3. Each of said adjusting screws 20 may be further provided with a pair of collars 24 embracing flange 23 so as to restrain said adjusting screws against longitudinal movement.

Figures 7, 8, 9, 10, 11:
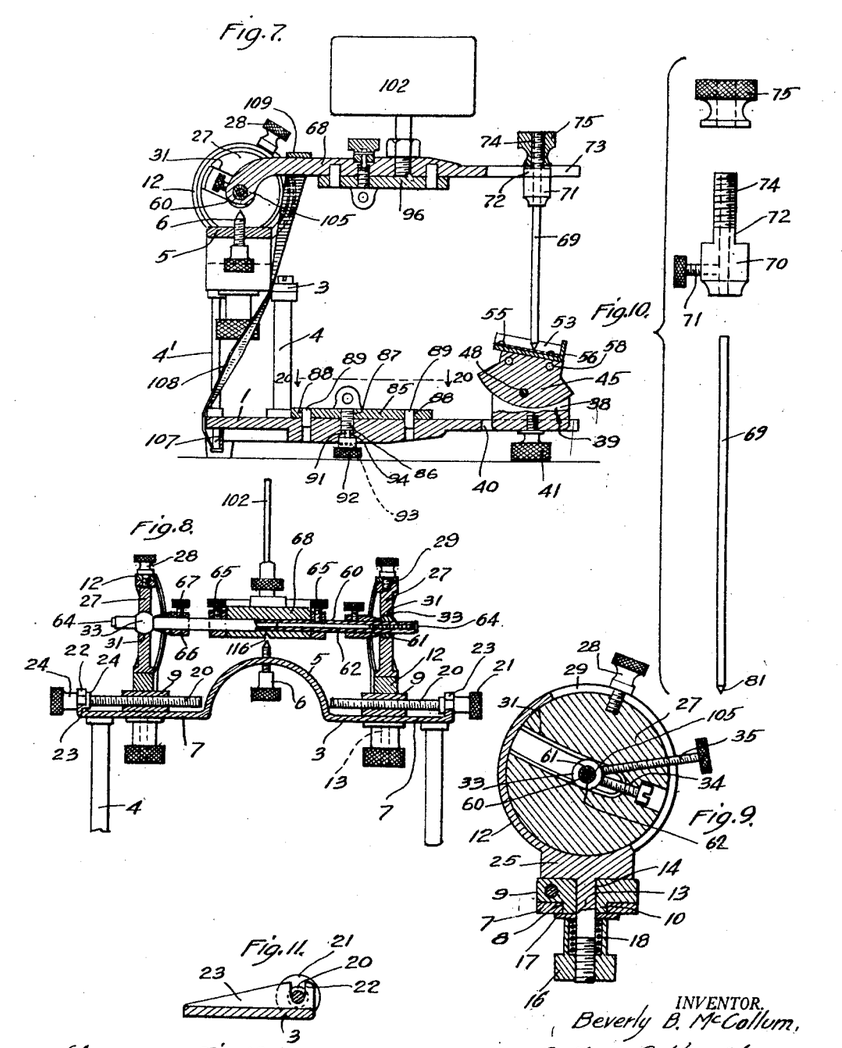
Fig. 7 is a longitudinal vertical section on line 7—7 in Fig. 2.
Fig. 8 is a transverse section on line 8—8 in Fig. 1.
Fig. 9 is a vertical section through one of the condyle heads and the supporting and adjusting means therefor.
Fig. 10 is a side elevation of the several portions of the incisal guide pin, disassembled from one another.
Fig. 11 is a detailed section on line 11—11 in Fig. 2.
Figure 12:
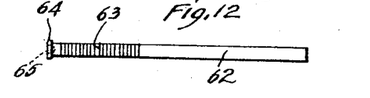
Fig. 12 is a view of one of the telescoping members of the axis rod.

A condyle head plate or disc 27 is mounted in each of the rings 12 in such manner as to permit rotation thereof about a horizontal axis for varying the vertical angle of the condyle path, and clamping screws 28 may be provided for holding said plates 27 in any rotative position to which they may be adjusted, said screws passing through annular grooves 29 in the rings 12 and screwing into the peripheries of the respective plates 27. When said screws are screwed inwardly they engage the respective rings 12 as shown in Fig. 8, so as to hold the plates 27 against rotation. Each condyle head plate is preferably provided with a mark 30 cooperating with calibrations 32 on the ring 12, for indicating the vertical angle of the condyle path.

Each of the condyle head plates 27 is provided with a groove or recess 31 for defining the corresponding condyle path, said groove extending in a substantially diametrical direction from the rearward edge of the plate 27 to a position in front of the center thereof, but slightly curved about a center of curvature lying somewhat above and to the front thereof. These grooves therefore define condyle paths which are concave upwardly. A ball 33 is mounted to slide or roll in each of the grooves 31, and it will be noted that the upper and lower faces of said grooves are somewhat concave in transverse section as shown in Fig. 8 so as to cause said balls to be retained therein and move in the condyle paths defined thereby.

Each of the plates 27 is further provided with a countersunk stop screw 34 projecting into the forward end of recess 31 for limiting the forward movement of ball 33 in said recess. The purpose of counter-sinking the head of screw 34 is to prevent such screw from limiting the range of rotative movement of plate 27 in the ring 12, as would be the case if such screw projected outwardly beyond said plate. This screw is preferably countersunk about ⅛ inch when the condyle bearing member 33 is in the center of the condyle head plate. This therefore permits said screw to be retracted by this amount without projecting beyond the condyle head plate, which allows the instrument to reproduce a retrusive movement of the condyles. An adjustable or auxiliary stop screw 35 may also be provided, somewhat above the normal stop screw 34 and slightly inclined with respect to the direction of recess 31 but projecting into said recess as shown in Fig. 9. This acts as a jack screw to hold the instrument temporarily in an adjustment corresponding to a lateral movement of the jaw.

Mounted at the front end of the base are the incisal guide means, which may comprise a block 38 having a downwardly extending tongue portion 39 engaging in groove 40 in said base so as to permit the entire incisal guide assembly to slide backward and forward on such base. Thumb screw 41 is provided for holding said block in any position on the base to which it may be set. To facilitate placing the incisal guide means in proper normal position the block 38 may advantageously be provided with a positioning mark 43 adapted for alignment with a corresponding mark 44 on the base. Said incisal guide means further comprise a segment 45 mounted upon block 38 and having arc-shaped bearing surfaces 46 and 46' sliding upon corresponding bearing surfaces 47 and 47' on said block. A threaded pin or thumb screw 48 projects through an arc-shaped slot 49 in block 38 and is threaded in segment 45. By loosening pin 48, segment 45 may be tilted in a vertical plane extending from front to rear of the device so as to raise or lower the rear edge of the incisal guide wings as hereinafter described, while tightening of said pin 48 serves to hold said segment in any such position to which it may be adjusted. Segment 45 may be provided with calibrations 42, cooperating with mark 43 on block 38, for indicating the degree of forward or rearward tilting of the incisal guide means.

Figures 13, 14, 15, 16, 17, 18, 19, 20:
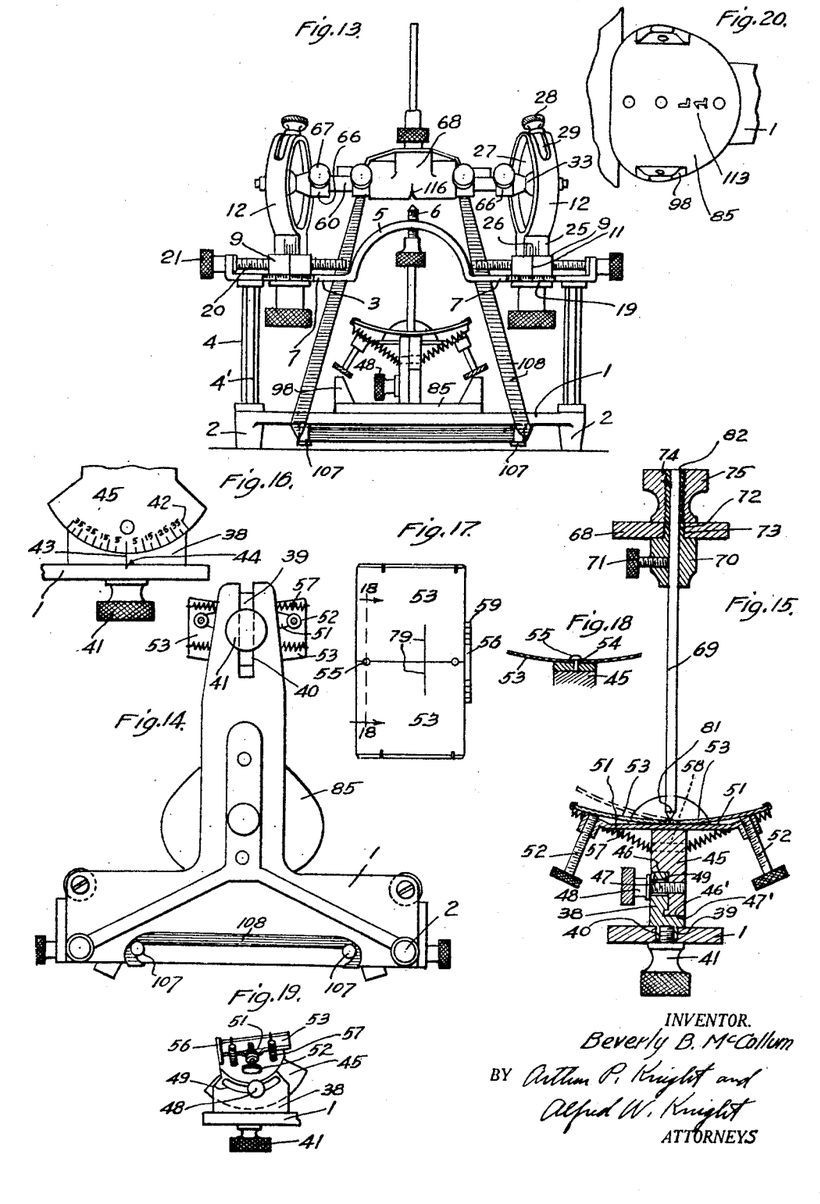
Fig. 13 is a rear elevation of the apparatus.
Fig. 14 is an inverted plan view.
Fig. 15 is a section on line 15—15 in Fig. 1, showing the incisal guide pin and guide plates.
Fig. 16 is a side elevation showing the scale means for indicating the forward and rearward tilting of the incisal guide plates.
Fig. 17 is a plan view of the incisal guide plates.
Fig. 18 is a detailed section on line 18—18 in Fig. 17.
Fig. 19 is a side elevation of the incisal guide plates and supporting means therefor, taken from the reverse side to Fig. 1.
Fig. 20 is a partial section on line 20—20 in Fig. 7.

Segment 45 may be provided with a pair of outwardly extending arms 51 formed thereon or secured thereto, at the outer ends of which are threadedly mounted the adjusting screws 52. A pair of incisal guide wings 53 are hingedly mounted on segment 45, for example by being notched at their central edges as shown at 54 in Fig. 18 so as to receive headed studs 55 secured to segment 45. A pair of coiled tension springs 57 extend through openings 58 in segment 45 and engage the outer edges of the respective guide wings 53 so as to tend to hold the same downwardly against the adjusting screws 52 and to also hold the same inwardly against the headed studs 55 and beneath the heads thereof. Adjustment of screws 52 therefore serves to vary the lateral tilting of each of the guide wings independently, and suitable scale means are provided or indicating the amount of such tilting. For example, segment 45 may be provided at its front end with an upturned scale plate 56 having calibrations 59 cooperating with the edges of the guide wings for this purpose.

A hinge axis or shaft 60 is journalled in openings or bearings 61 in the balls 33 aforesaid, so as to permit the shaft to both slide and rotate with respect to each of said balls independently. Said shaft is preferably tubular in form and is provided with two extension rods 62 telescoping therein, so as to permit the ends of said shaft to be extended outwardly for the purpose hereinafter described. Each of said extension rods is preferably provided with calibrations 63 and is headed or provided with a flange at its outer end as at 64 so as to prevent it from being pushed too far into the axis shaft. The head of each of these pins is shaped to receive a female head on the caliper pin of a face bow and is also recessed as at 65 to receive a pointed caliper pin. Set screws 65 are provided for holding the extension rods 62 in any position to which they may be adjusted. A stop collar 66, provided with set screw 67, is slidably mounted on the shaft 60 inside of each of the condyle plates aforesaid.

An upper arm or bar 68 is mounted upon or secured to the central portion of shaft 60 and extends forwardly to a position above the incisal guide means above described. An incisal guide pin 69 is mounted at the forward end of said arm 68, and I prefer to use the construction shown particularly in Figs. 10 and 15 for supporting said guide pin. As there shown said pin is slidably mounted in a block 70 and is held in position therein by means of set screw 71. Block 70 is provided with upwardly projecting tongue portion 72 slidably mounted in groove or slot 73 in the forward end of arm 68, and is also provided with screw-threaded projection 74 receiving a nut 75 for clamping the block and guide pin in position on arm 68. In order to indicate the proper relative adjustment of these parts, a positioning mark 77 may be provided on block 70 and a corresponding mark 78 on the under side of arm 68, in such manner that when these marks are aligned with one another the guide pin 69 is disposed in proper relative position from front to rear with respect to the guide wings 53 above mentioned. Said guide wings are preferably provided with marks 79, the arrangement being such that when the guide pin is set by alignment of marks 77 and 78 and the guide wings are set by alignment of marks 43 and 44, the lower pointed end 81 of said guide pin, when in central position, rests at the intersection of said marks 79 with the central line between the two guide wings. The guide pin 69 is also preferably made of such length that when its upper end is brought exactly flush with the upper end of the threaded projection 74 as indicated at 82 in Fig. 15, and the guide pin is lowered so as to rest at the center of the incisal guide means as there shown, the upper arm 68 will extend horizontally or parallel to base 1. Furthermore, the arrangement is such that the central point between the marks 79 on the guide wings is located at the center about which segment 45 is tilted upon its bearing surfaces 46 and 46', so that when the guide pin is resting in the above described position the guide wings may be tilted in either direction from front to rear without disturbing the position of said guide pin.

A lower model frame 85 is secured to the base 1 by means of thumb screw 86 screwing in a threaded opening 87 in said frame. Said frame is also provided with openings 88 engaging guide pins 89 on base 1 so as to accurately position the frame with respect to the base. Thumb screw 86 is preferably constructed as shown in Fig. 7 so as to prevent the same from being displaced from the base even when the model frame is removed. For this purpose screw 86 is provided with a neck portion 91 of reduced diameter and the lower end thereof enters the head 92 and is secured thereto as by means of transverse pin 93. Base 1 is formed with a shoulder 94 between the threaded portion of screw 86 and the head 92, which serves to retain said thumb screw in position and prevent the same from being lost. The upper model frame 96 is mounted upon arm 68 in exactly the same manner as the lower model frame is mounted. Each of said model frames, with the respective models in position thereon, may therefore be removed from the articulator and readily replaced therein in the same positions as before.

Each of the model frames is also provided with a pair of projecting lugs 98 at the sides thereof, through which pass small screws 99 engaging in threaded anchor members 100 which are provided with annular grooves 101 and are embedded in the plaster model when the same is first mounted in the articulator. Therefore if desired the screws 99 may be removed and the models removed from the frames and remounted therein without requiring removal of the frames from the articulator.

A rectangular or other suitably shaped center-locating plate 102 may be mounted upon the upper arm 68 and may be covered with modelling compound or receive a card or a sheet of metal in the usual manner, upon which may be inscribed the arcs whose intersection forms the center for that arc known as the curve of Spee upon which it is highly desirable that the teeth should be arranged. Said plate, being rectangular and being properly placed and dimensioned, provides a greater area for the inscribing of arcs and the location of the center above mentioned, than has been provided by any similar device heretofore used. The axis shaft 60 is preferably formed with a horizontal groove 105 along the forward face thereof to receive one point of a pair of calipers for use in inscribing the above mentioned arcs upon the plate 102.

Figure 1:
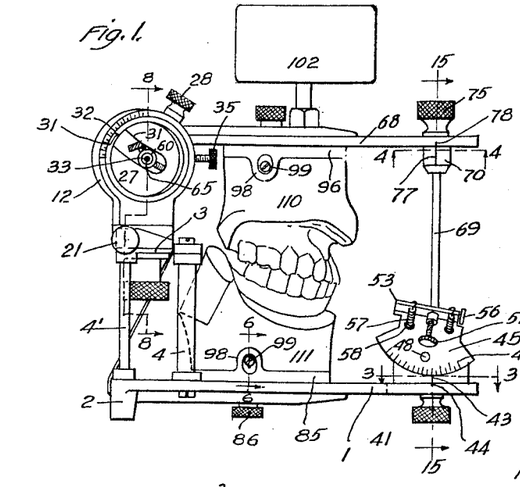
Fig. 1 is a side elevation of the articulator, showing a pair of models in place therein, such models being omitted in all the other views.
Figure 2:
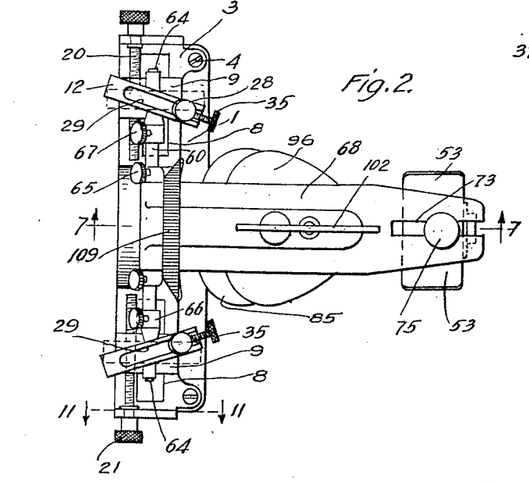
Fig. 2 is a plan view thereof.
Figure 3:
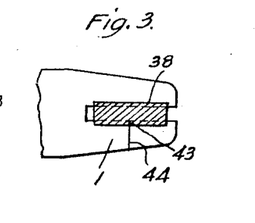
Fig. 3 is a horizontal section on line 3—3 in Fig. 1.
Figure 4:
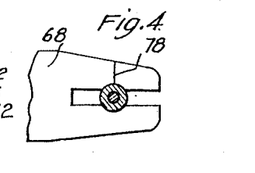
Fig. 4 is an inverted horizontal section on line 4—4 in Fig. 1.
Figure 5:
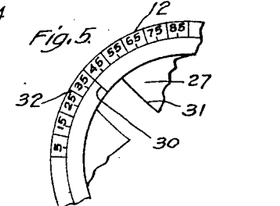
Fig. 5 is an enlarged partial side elevation of one of the condyle heads of the device showing the calibrations thereof.
Figure 6:
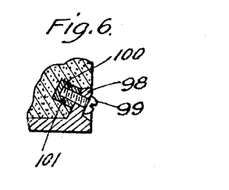
Fig. 6 is a partial section on line 6—6 in Fig. 1, showing the means for securing the models to the model frames.

Downwardly projecting pins 107 are provided beneath base 1, over which a rubber band 108 is stretched, said rubber band extending thence upwardly and over the upper arm 68 and in front of shaft 60 as shown at 109 in Figs. 2 and 7. Said rubber band therefore places a tension between the base 1 and the upper arm 68, so as to hold the models in contact with or in apposition to each other. A centering notch 116 is preferably provided at the under side of arm 68 at the rear end thereof. Said arm may be properly centered with respect to the base of the articulator by alignment of said notch with screw 6.

Figures 21, 22, 23, 24:
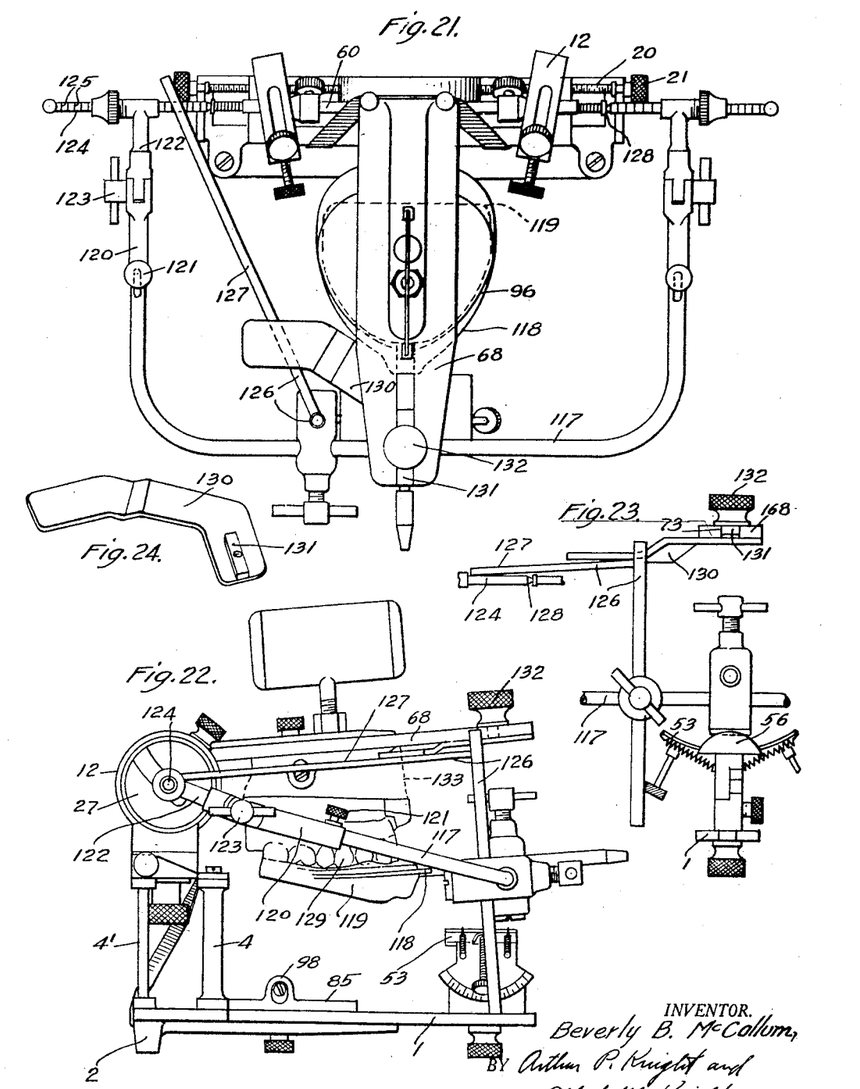
Fig. 21 is a plan view of the articulator with the face bow applied thereto for locating the upper model in the articulator.
Fig. 22 is a side elevation of the parts as shown in Fig. 21.
Fig. 23 is a partial front elevation thereof.
Fig. 24 is a perspective view of the paralleling bar.

The method of using the above described articulator may be described as follows:

By means of a so-called bite block of wax or modelling compound, and any of the well known forms of face bow, the position of the upper jaw and teeth with relation to the hinge axis of the mandible (lower jaw) is obtained. One form of face bow which may be used for this purpose is indicated in Figs. 21 to 23. Such face bow comprises a U-shaped bow 117, upon which is mounted a bite plate 118 carrying the bite block 119. Each of the side arms of face bow 117 may be provided with a telescoping portion 120 and set screw 121 for effecting lengthwise adjustment thereof and with a hinged portion 122 and tightening screw 123 for permitting adjustment. Each of said arms is provided at its rear end with a caliper member 124 mounted for lateral adjustment thereon and provided with calibrations 125 for indicating its position. Said caliper pins may as shown be pointed at their inner ends or may be provided with female heads. The well known device called the Wadsworth T, indicated at 126, is also preferably attached to the face bow and manipulated in the usual manner to denote the condyle orbital plane, the horizontal arm 127 thereof resting at its rear end upon one of the caliper pins 124.

It is understood that in the manipulation of the face bow the bite block is mounted thereon and the impression of the upper jaw is taken therein, and it is then necessary to mount the face bow upon the articulator in order that the upper model may be transferred to or oriented upon the articulator in its proper relationship to the hinge axis. In the articulators heretofore employed the hinge axis or shaft has been of fixed length and it has therefore been necessary to move the caliper pins on the face bow so as to reduce or increase the distance between them to correspond to the length of such axis or shaft. In using my improved form of articulator, however, as shown in Fig. 21, the telescoping extension rods 62 may be adjusted in or out so as to adjust the length of the hinge axis to the normal distance between the caliper pins on the face bow and bring the heads of said extension rods into engagement with said caliper pins, as at 128, thus obviating any possibility of loss of the proper relationship between the bite block and the instrument. The two extension rods 62 are preferably extended equal amounts as indicated by the calibrations 63 thereon so as to bring the bite block in properly centered position with respect to the articulator. The extension rods are locked in proper position by means of set screws 65. The face bow is then held in position with its caliper pins engaging the ends of the hinge axis and the previously formed model of the upper denture or arch is placed in the impressions made in the bite block by the upper teeth or jaw of the patient, as shown at 129 in Fig. 22.

The inciscal guide pin 69 is removed during this part of the operation, preferably by loosening nut 75 so that the whole guide pin assembly may be removed from slot 73. The paralleling bar 130 is then attached to arm 68 and said arm is then lowered to position over the upper model until said paralleling bar rests upon the horizontal arm 127 of the Wadsworth T, thus automatically bringing arm 68 to rest in a plane parallel to the horizontal arm of the T. Said paralleling bar, as shown in Fig. 24, is preferably provided for this purpose with a tongue 131 fitting in slot 73 of arm 68 and with a clamping nut 132 for holding it in position on said arm. This operation accurately establishes the model in relation to a position equivalent to that of the upper patient's orbital plane. The upper model is then attached to the model frame 68 by filling in with plaster of Paris or similar material as indicated in dotted lines at 133 in Fig. 22. When the plaster has set the face bow and bite block are removed from the articulator. The paralleling bar is then removed and the inciscal guide pin replaced, while the telescoping axis rods 62 are released, pushed into the hollow shaft 60 and locked there so as to be out of the way in the further manipulation of the articulator. The centering screw 6 is then brought to position to engage notch 116 and accurately relate the upper and lower arms 68 and 1, and the collars 66 on axis 60 are placed in position against the balls 33 and locked in this position, with the condyle head plates in approximately the center of their range of lateral movement and turned so as to be substantially parallel to one another.

Figure 25:
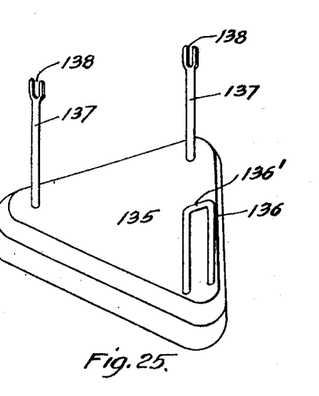
Fig. 25 is a perspective view of a supporting stand for holding the articulator in inverted position.
Figure 26:
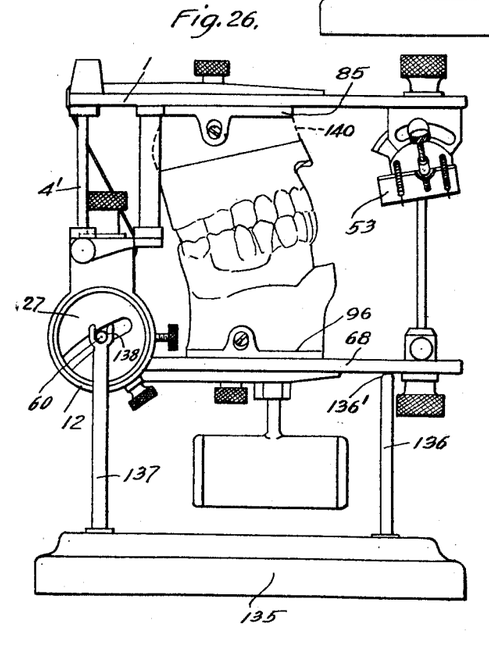
Fig. 26 is a side elevation showing the articulator inverted upon this supporting stand.
Figure 27:
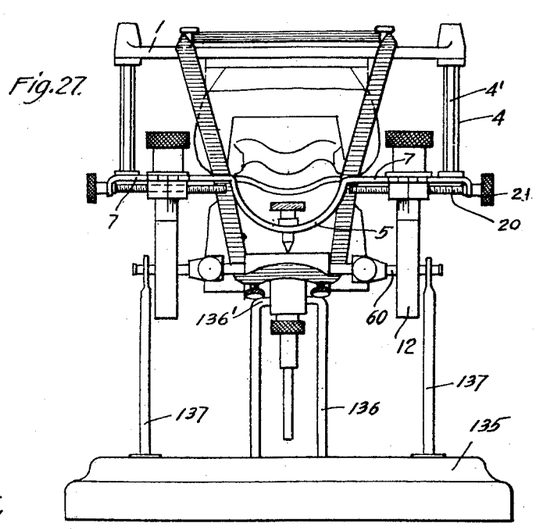
Fig. 27 is a rear elevation of the parts shown in Fig. 26.

The articulator is then inverted and placed upon a suitable support, for example as shown in Figs. 26 and 27. An advantageous form of supporting means for use in this connection is illustrated in these figures and Fig. 25, said supporting means comprising a base 135, a supporting member 136 extending upwardly from the front portion of said base and having a flat portion 136' at its upper end upon which the upper arm 68 of the articulator may rest, and two supporting members 137 extending upwardly from the rear portion of the base and formed at their upper ends with notches 138, for receiving the axis rod 60 of the articulator. The bottoms of notches 138 are so related to the top of the front supporting leg 136 that when the articulator is placed upside down on these supporting legs the upper arm 68 (which is at that time in the lower position) extends horizontally.

A centric bite in wax is then placed upon the upper model and the lower model placed in position thereon as shown in Fig. 26. With the parts in the position there shown the wax bite is in between the two models for indicating their proper relative positions, but said bite is not shown in this figure as it does not project beyond the teeth sufficiently to show. The lower model is then secured to the lower model frame 85 by filling in with plaster of Paris as indicated in dotted line at 140 in Fig. 26. During this operation the incisal guide pin should be in its normal position as above described, so that the arm 68 is parallel to the base 1 of the articulator. The models are at this time oriented in their proper relationship to one another and to the dynamic centers. When the plaster of Paris has set, the articulator may again be turned right side up.

Check bites of wax or similar material are then made by having a patient bite first in the right lateral position and then in the left lateral position. The incisal guide pin 69 is removed and the stops 66 on the axis shaft are loosened by means of set screws 67. The condyle heads are then brought to a position at approximately 10 mm. inside the mid-point of their lateral paths or about 10 mm. inwardly from their mid-point positions toward the median line of the articulator. In order to move the condyle heads to this position the nuts 16 are loosened and adjusting screws 20 used to move the blocks 9 in or out to the desired position.

One of the lateral check bites (for example the right check bite) is placed upon one of the models and the other model is moved laterally until the teeth fit into the indentations in the wax. The lower model and articulator are then in the relative position assumed by the patient's mandible when biting laterally to the right. The left condyle path is now adjusted with respect to its vertical angle until the model rests easily in the indentations of the check bite, this being accomplished by loosening screw 28 and turning the left condyle head plate 27 in its ring 12 to bring the condyle path groove 31 to the proper position. Screw 28 is then tightened so as to lock said condyle head plate in this position. The lower model and articulator will thereafter move laterally to the right on the angle and to the position thus determined, duplicating the movement of the patient's jaw. This angle is indicated by calibrations 32 and may be recorded.

With the right check bite still in place the right condyle head is moved outwardly by means of adjusting screw 20 until the ball 33 therein contacts the stop screw 34. This fixes the end of the diagonal rotation axis upon which the articulator rotates when duplicating the right lateral motion of the patient's jaw. The position of the condyle head with respect to its lateral adjustment is indicated by means of calibrations 19 and this adjustment may also be recorded.

In like manner the left lateral check bite is used and the right condyle path and left diagonal rotation axis upon which the articulator operates to reproduce left lateral movements of the patient's jaw are adjusted, these adjustments being indicated by means of the calibrations and recorded as before.

The left check bite is then removed and the models brought into apposition with one another in their centric or static position. The stop collars 66 are moved outwardly on shaft 60 into contact with the condyle head balls 33. The condyle heads are turned about their vertical axes so that their rear edges are directed outwardly, the right check bite replaced, and the models again fitted therein. The left condyle head is then turned inwardly about its vertical axis until the ball 33 therein contacts the stop 66, and the condyle head is then locked in that position by means of lock nut 16. The left check bite is then used in a similar manner, and the right condyle head turned in until the ball 33 therein contacts stop 66, and is then locked in that position. This permits the lower model and articulator base to move bodily to the right and left relatively to the upper model in the same manner and to the same extent as the patient's lower jaw bodily moved laterally when making the wax bites in lateral positions. The degree of this bodily movement, known as side shift, is indicated on calibrations 26 for each condyle head and may therefore be recorded.

The incisal guide means above described may be tilted bodily so that the posterior edge of guide wings 53 is raised or lowered, and each side wing may also be raised or lowered by adjusting screws 52 so as to vary the slope or inclination thereof in a lateral direction. As the models are moved upon each other as in reproducing the chewing motion of the patient, the incisal guide pin 69 moves across the guide wings 53, further influencing the motions of the articulator. The degree of tilting of the incisal guide wings, both laterally and from front to rear, controls the opening component of the lateral movement of the jaws or models. The adjustments of the incisal guide wings are indicated by calibrations 42 and 59 and these adjustments may also be recorded. It will be noted that the incisal guide pin is caused by the guide wings to move in an arc shaped path, which causes the chewing motion to be more faithfully reproduced. Furthermore, adjustment of the incisal guide means is entirely independent of the adjustments of the condyle heads and axis shaft, and the central or normal position of the incisal guide pin remains the same regardless of the adjustment of the incisal guide means, since the point upon which said guide pin rests at such time is at the center about which both the lateral and longitudinal tilting of the guide wings occurs.

I prefer to provide a chart or diagram showing all of the adjustments of the instrument, upon which the adjustments indicated by the several calibrations may be recorded. This chart is in each case marked with the patient's name, so that the same instrument may be used for other patients and may be readily restored to the adjustments corresponding to any particular patient at any time.

The models may be removed from the articulator by removing screws 99 from the model frames, the threaded anchor members 100 remaining in the plaster models. Each articulator preferably has a serial number stamped or cut into the opposing surfaces of the two model frames as indicated at 113 in Fig. 20, so that each plaster model is automatically marked with the number of the instrument upon which it was mounted, and may therefore be mounted on the same articulator at any time for further use. Furthermore, the lower model frame preferably has the letter "L" stamped therein as shown, while the upper frame has the letter "U" stamped therein, so that the two models will also bear these respective letters, indicating "lower" and "upper".

Should it be desirable to remove one or both of the models in order more readily to perform some of the operations upon them the entire model and frame 85 or 96 may be readily removed by unscrewing the thumb screw 86. Because of the construction above described these thumb screws cannot become displaced from the articulator and lost. Each model frame when replaced in the articulator is accurately guided to proper position by guide pins 89 on the articulator.

The raised track portions 7 upon which the condyle heads are mounted to slide and rotate constitute an advantageous feature of my invention, since they provide a rigid support close beneath each condyle head and eliminate the long posts by means of which the condyle heads of other articulators are supported from the base of the articulator. These long supporting posts formerly used do not hold the condyle heads rigidly in position and hence impair the accuracy of the work performed therewith.

I claim:

1. In an articulator, guide means defining two condyle paths, a tubular axis shaft, mounted in and extending through said guide means, and a pair of telescoping extension members slidably mounted within the respective ends of said shaft so as to be movable inwardly and outwardly therein regardless of the position of said guide means, the movable arm of said articulator being mounted for rotation about the axis of said shaft.

2. A construction as set forth in claim 1, each of said telescoping extension members being provided with calibrations for indicating the extension thereof.

3. A construction as set forth in claim 1, each of said extension members having a projecting flange at its outer end adapted to engage the corresponding end of the tubular shaft to prevent it from entering too far into said tubular shaft.

4. In an articulator, a pair of incisal guide wings meeting one another at the central plane of the articulator, said guide wings being mounted pivotally at their intersection, an adjusting screw bearing against the underside of each of said guide wings for tilting the same upwardly and tension means engaging said guide wings for holding the same downwardly against said adjusting screws.

5. In an articulator, a base, an axis shaft, an arm mounted to rotate about the axis of said shaft, a pair of condyle heads defining condyle paths and supporting said axis shaft, track means extending transversely directly beneath said condyle heads and rigidly supported in position above said base, a pair of supporting blocks slidably mounted on said track means, said condyle heads being mounted on the supporting blocks and having threaded members extending through said blocks and through said track means, and clamping nuts on the lower ends of the respective threaded members and adapted to clamp said track means and bearing blocks between said nuts and said condyle heads so as to hold the condyle heads against both rotative and transverse movement.

6. In combination with an articulator comprising a lower arm provided with supporting means and an upper arm having a transverse shaft rotatably mounted on said supporting means, a supporting stand for holding said articulator in inverted position, said stand comprising a base, a pair of members extending upwardly from said base and formed at their upper ends to receive said shaft, and another member extending upwardly from said base to receive the upper arm of the articulator when said articulator is inverted thereon, said last-named upwardly extending members being of such height with respect to said first-named upwardly extending members that said upper arm of the articulator extends substantially horizontally when resting thereon.

7. In combination with a face bow having caliper members movable in position to indicate the location of the hinge axis of the jaw, and with a T-bar having an upwardly extending arm secured to said face bow and a rearwardly extending arm perpendicular to said first arm and engaging at its rear end with one of said caliper members so as to define the condyle orbital plane, an articulator comprising a relatively fixed lower arm, an upper arm mounted on an axis shaft whose ends are aligned with said caliper members, and a paralleling bar secured to said upper arm and having a portion engaging said rearwardly extending arm so as to bring said upper arm of the articulator in a plane parallel to said rearwardly extending arm.

8. A face bow for attachment to an articulator, comprising a U-shaped bow including a transverse member and a rearwardly extending arm at each side thereof, telescoping means for lengthwise extension of each of said arms, the rear portion of each of said arms being hingedly mounted to swing in a vertical plane, means for clamping said hingedly mounted portions in any positions to which they may be swung, and two caliper members mounted at the rear ends of the respective hinged portions and extending inwardly toward one another, said caliper members being adjustable laterally with respect to said hinged portions and being provided with means for securing the same in any position of lateral adjustment and with scale means for indicating such position.

9. A paralleling attachment for an articulator comprising, in combination with the upper arm of an articulator, a member extending in a plane parallel to the plane of said arm and to one side thereof, and means detachably securing said member to said arm.

10. In an articulator, transversely extending track means, a pair of supporting blocks slidably mounted on said track means, condyle heads mounted on the respective supporting blocks and having threaded members extending through said blocks and through said track means, clamping nuts on the lower ends of the respective threaded members and adapted to clamp said track means and bearing blocks between said nuts and said condyle heads so as to hold the condyle heads against both rotative and transverse movement, and springs engaging between said track means and the respective clamping nuts so as to frictionally hold the condyle heads in position even when said nuts are loosened.

11. In an articulator, transversely extending track means, a pair of condyle heads slidably mounted on said track means for adjustment transversely to the articulator and provided with means defining the respective condyle paths, a shaft mounted for movement in the condyle paths of the respective condyle heads, said shaft being of sufficient length to extend through both condyle heads when said condyle heads are in the outermost positions to which they may be adjusted on said track means, and a pair of extension members mounted within said shaft so as to permit sliding movement thereof longitudinally of the shaft regardless of the position of the condyle heads and formed at their ends to receive the caliper members of a face bow.

12. An apparatus as set forth in claim 11, each of said extension members being provided at its outer end with a head for engagement with a caliper member having a female head and being also provided with a recess located centrally of the head thereon and adapted to receive a pointed caliper member.

In testimony whereof I have hereunto subscribed my name this 12th day of May, 1927.

BEVERLY B. McCOLLUM.